United States Patent Office 2,908,695
Patented Oct. 13, 1959

2,908,695
SEPARATION OF STEROID MIXTURES

Alan Gibson Long, Greenford, England, and Leonard James Wyman, Montrose, Scotland, assignors to Glaxo Laboratories Limited, Greenford, Middlesex, England, a British company No Drawing. Application September 20, 1957
Serial No. 685,088

Claims priority, application Great Britain
September 21, 1956

9 Claims. (Cl. 260—397.45)

This invention is concerned with improvements in or relating to the separation of steroid mixtures containing on the one hand 3-keto-$\Delta^4$-steroids and/or 3-keto-$\Delta^{1:4}$-steroids and on the other hand 3-keto-$\Delta^1$-steroids. The said steroids have the following structures in ring A:

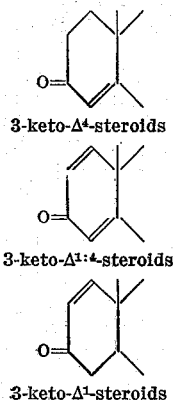

3-keto-$\Delta^4$-steroids 3-keto-$\Delta^{1:4}$-steroids 3-keto-$\Delta^1$-steroids Many 3-keto-$\Delta^4$-steroids for example, cortisone, are substances of importance, and thus much attention has in recent years been directed to the preparation of such compounds. Certain 3-keto-$\Delta^{1:4}$-steroids, e.g. $\Delta^1$ cortisone, have recently become of importance. Various methods for the introduction of the 3-keto-$\Delta^4$ and 3-keto-$\Delta^{1:4}$-systems into ring A of steroid substances have been devised, the methods employed for intermediates in the normal series differing somewhat from the methods employed for intermediates in the allo series, owing to the different reactions of compounds of the allo series. In both series however it is often found that the methods employed for the preparation of both 3-keto-$\Delta^4$-steroids and 3-keto-$\Delta^{1:4}$-steroids also give rise to 3-keto-$\Delta^1$-steroids as side products; thus for example we find that the series of processes described in copending applications of Walker et al., S. N. 441,686, filed July 6, 1954, now Patent No. 2,848,463; Walker et al., S. N. 444,916, filed July 21, 1954, now Patent No. 2,814,630; Oughton et al., S. N. 447,394, filed August 2, 1954, now Patent No. 2,855,414; and Long et al., S. N. 507,146, filed May 9, 1955, now Patent No. 2,818,414 give rise to a cortisone ester contaminated with the corresponding $\Delta^1$ isomer ($\Delta^1$-dehydro-4:5$\alpha$-dihydro-cortisone ester). The separation of mixtures of 3-keto-$\Delta^4$-steroids or 3-keto-$\Delta^{1:4}$-steroids and 3-keto-$\Delta^1$-steroids is very difficult owing to the great similarity of the properties of these substances and for example in the preparation of cortisone esters by the processes described in said specifications we have experienced difficulty in obtaining pure cortisone esters for this reason.

It has now been found that it is possible to separate 3-keto-$\Delta^1$-steroids from mixtures containing such steroids and 3-keto-$\Delta^4$-steroids and/or 3-keto-$\Delta^{1:4}$-steroids as a result of our surprising discovery that 3-keto-$\Delta^1$-steroids will readily react with bisulphite ions to give water soluble derivatives, which are derivatives of the corresponding 1-sulphonic acids, whereas under similar conditions both 3-keto-$\Delta^4$-steroids and 3-keto-$\Delta^{1:4}$-steroids either do not react or react much more slowly.

According to the present invention, therefore, there is provided a process for the separation of mixtures containing on the one hand 3-keto-$\Delta^4$-steroids and/or 3-keto-$\Delta^{1:4}$-steroids and on the other hand 3-keto-$\Delta^1$-steroids which comprises reacting the mixture with a substance furnishing bisulphite ions to form a water-soluble derivative of the 3-keto-$\Delta^1$-steroid which is dissolved in an aqueous medium and separated from the insoluble 3-keto-$\Delta^4$-steroid and/or 3-keto-$\Delta^{1:4}$-steroid.

The water-soluble derivative may, if desired, be recovered with the 3-keto-$\Delta^1$-steroid regenerated therefrom.

According to a preferred feature of the invention the 3-keto-$\Delta^4$-steroid has the formula:

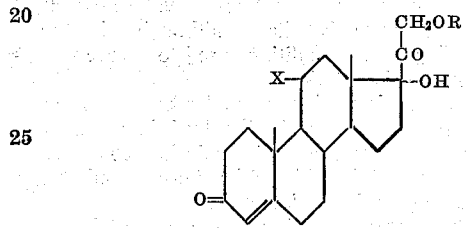

A the 3-keto-$\Delta^{1:4}$-steroid has the formula:

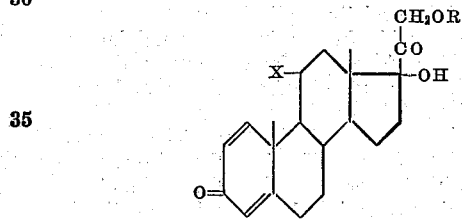

B and the 3-keto-$\Delta^1$-steroid has the formula:

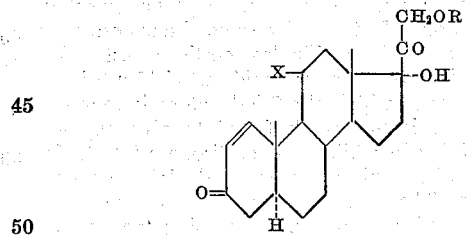

C where X is ketonic oxygen atom or hydroxyl group and R is an acyl group or a hydrogen atom.

The process according to the invention is preferably carried out in an aqueous medium so that the water-soluble derivative is dissolved on formation. The substance furnishing bisulphite ions may be a bisulphite or alternatively sulphurous acid or a sulphite, both of which in the presence of water give rise to a proportion of bisulphite ions; alkali metal or ammonium bisulphites or sulphites are preferred since these have desirable water-solubility characteristics. We particularly prefer to use sodium metabisulphite. It is of course well known that sodium metabisulphite in the presence of water gives rise to bisulphite (and sodium) ions and it is also advantageous in having useful solubility characteristics in various aqueous organic solvents.

The pH at which the reaction of the mixture of steroids is reacted with the substance furnishing bisulphite ions is important. Thus many steroids are known to be sensitive to extremes of pH and therefore the reaction should be carried out at a pH at which the steroid reactants are substantially stable; the pH used should of course be one at which bisulphite ions may exist in a sufficient concentration for the desired reaction.

In the case of steroid starting materials having ester groups (e.g. 21-acyloxy compounds) a pH higher than 8 can be used but it is preferable in such cases to have present a readily hydrolysed ester e.g. ethyl acetate which will inhibit hydrolysis of the steroid ester. The ester used should preferably be of the same acid as used to esterify the steroid in order to prevent ester exchange reactions. The presence of such an ester will also have the effect of buffering the pH to some extent thus ensuring the presence of bisulphite-ions. In general a pH between 4 and 8 is satisfactory.

The reaction may be carried out under either homogeneous or heterogeneous conditions.

When operating under homogeneous conditions the mixture to be separated may be dissolved in a suitable water-miscible organic solvent e.g., acetonitrile, dioxan or ethanol, the bisulphite-ion yielding substance added in aqueous solution and the mixture reacted. Alternatively, the mixture may be dissolved in an aqueous water-miscible organic solvent and solid bisulphite ion yielding substance added. A ratio of 2 volumes of water-miscible solvent to 1 volume water is suitable, although this may be varied according to the conditions used to ensure that various reactants are in solution.

Where the reaction is carried out under heterogeneous conditions the steroid mixture is dissolved in a water-immiscible organic solvent and the solution contacted with a solution containing bisulphite ions; a suitable solvent for this purpose is ethyl acetate.

Although the process according to the present invention has so far been described in general terms it has been found to be especially applicable to the separation of 3-keto-$\Delta^1$-5$\alpha$-steroids from mixtures containing such steroids and 3-keto-$\Delta^4$-steroids, for example to the separation of $\Delta^1$-dehydro-4:5$\alpha$-dihydrocortisone and mono- and di-esters thereof from mixtures of such steroids and cortisone and its mono- and di-esters. The process is therefore of value in the purification of cortisone acetate contaminated with the corresponding $\Delta^1$ compound.

Thus, the above-mentioned copending applications Serial Numbers 441,686, 444,916, 447,394, and 507,146 describe the preparation of cortisone and its esters by the dibromination of 4:5$\alpha$-dihydro-cortisone ester to yield 2:4-dibromo-4:5$\alpha$-dihydro-cortisone ester followed by reaction with sodium iodide to yield a 2-iodocortisone ester after which the 2-iodo atom is removed by reduction. This process is found to give an end-product containing in addition to cortisone ester, $\Delta^1$-dehydro-4:5$\alpha$-dihydro-cortisone ester and 4:5-$\alpha$-dihydrocortisone ester. The 4:5$\alpha$-dihydrocortisone ester may be removed to a major extent, e.g., by using the process described in Walker et al. application S. N. 444,916, but the 3-keto-$\Delta^1$ compound is exceedingly difficult to remove by conventional techniques. However, if the process according to the present invention is used the 3-keto-$\Delta^1$ compound can be separated off to a large extent.

Where the mixture being purified also contains a 3-keto-steroid which is saturated in ring A this may be separated off before or after treatment according to the invention. However, we have found that in such circumstances it is preferable to remove the saturated 3-keto-steroid, for example by the process described in Walker et al. application S. N. 444,916, before application of the present process.

The process according to the invention also finds particular application in the separation of 3-keto-$\Delta^1$-5$\alpha$ steroids from mixtures containing such steroids and 3-keto-$\Delta^{1:4}$-steroids, for example to the separation of $\Delta^1$-dehydro-4:5$\alpha$-dihydro-cortisone and mono- and di-esters thereof from mixtures of such steroids and $\Delta^1$ cortisone and its mono- and di-esters and also to the separation of the corresponding 11$\beta$-hydroxy compounds. The process according to the invention is hence of value in the purification of $\Delta^1$ cortisone acetate and $\Delta^1$ hydrocortisone acetate contaminated with the corresponding $\Delta^1$-compounds.

Although, it is believed that the 3-keto-$\Delta^1$-steroid reacts with the bisulphite ions to form a sulphonate having the structure

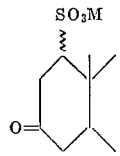

(where M is a cation, e.g. H$^+$, Na$^+$, K$^+$, Li$^+$ or NH$^+_4$,) it has been found in practice that it is not possible to calculate the amount of the bisulphite ion-forming compound required on theoretical considerations. The optimal amount of the substance furnishing bisulphite ions must be determined by preliminary experiments. We have found that amounts required generally lie between 1–20 moles of sodium metabisulphite or its equivalent per mole of steroid. The amount of bisulphite ion-forming compound required however varies from mixture to mixture since the mixture may be contaminated with other substances which react with bisulphite ions. Thus, if the process according to the invention has been preceded by a step according to Walker et al. application S. N. 444,916 without the isolation of the end-product thereof, the initial solution may contain a certain amount of formaldehyde and additional bisulphite ion-forming compound will have to be used since it will react with formaldehyde. In such cases it may be necessary to use even more than 20 moles of sodium metabisulphite or the equivalent thereof.

The reaction may conveniently be carried out under reflux for example on a steam bath.

It is not possible to specify any optimal time of reaction since this varies from mixture to mixture. The reaction should however be continued until the formation of the desired water-soluble derivative is substantially complete. Preferably the reaction should not be allowed to continue in excess of this time since it has been found that the yield tends thereafter to decline. Thus, in the separation of $\Delta^1$-dehydro-4:5$\alpha$-dihydrocortisone ester from cortisone esters yields of a high order have been obtained after approximately 16 hours, but when the reaction was continued until 64 hours the yield was appreciably smaller.

The course of the reaction may be followed by observing the change in optical properties such as specific optical rotation and specific extinction coefficient. Thus in the case of cortisone and $\Delta'$ cortisone acetates the $[\alpha]_D$ (acetone) rises to +180–182° and $$E^{1\%}_{1\text{cm.}} \text{ at } 238 \text{ m}\mu$$

to a value between 350 and 390. Since $\Delta^1$-dehydro-4:5$\alpha$-dihydro cortisone acetate shows $\lambda$ max. 228 m$\mu$ a good test for its presence in cortisone acetate is the ratio:

$$X = \frac{E^{1\%}_{1\text{cm.}} \text{ at } 238 \text{ m}\mu}{E^{1\%}_{1\text{cm.}} \text{ at } 228 \text{ m}\mu}$$

For pure cortisone acetate $X=1.20-1.21$ and since the mixture being treated may have a value of X less than 1.15 appropriate reaction conditions may be devised. 3-keto-$\Delta^1$ and 3-keto-$\Delta^4$-steroids other than cortisone and $\Delta'$ cortisone also have characteristic absorption maximum in the ultra-violet, the exact positions of which depend on the substitution in the rest of the molecule and are either known or readily determined.

Where a heterogeneous reaction system is used the course of the reaction may be followed by observing the change of optical rotation of the aqueous layer which should reach a maximum, alternatively the optical rotation of the non-aqueous layer may be observed.

The invention includes within its scope as new compounds steroids having in ring A the structure:

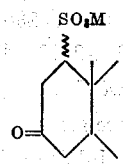

where M is a cation, particularly hydrogen, an alkali metal or an ammonium group. The 5-hydrogen atom may have either the α- or β-configuration.

A group of steroids of this type are those having the formula

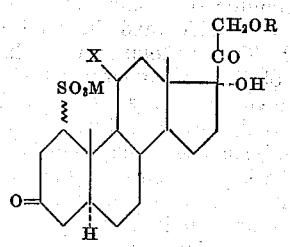

where X, R and M are as hereinbefore defined, an example of a compound of this formula is sodium 21-acetoxy - 17α - hydroxy - 3:11:20 - trioxo - 5α - pregnane-1ξ-sulphonate, the monohydrate of which has been found to have the following constants:

Melting point: 223–226° C. (by capillary method; decomp.)
208–214° C. (Koffler; slight decomp.)
Optical rotation $[\alpha]_D^{22} = +100°$ (c 1.745; water)
λ max. (water) = 290 mμ ($E_{1\,cm.}^{1\%}$ 1)
Infra red = bands at 1185 and 1083 cm.$^{-1}$ probably due to SO$_3$Na group The figures have been obtained with the purest material we have been able to prepare.

In order that the invention may be well understood the following examples are given by way of illustration. It will be understood that where we refer to a starting material as "cortisone acetate" we are referring to cortisone acetate contaminated with its Δ$^1$ isomer: the impurity of the starting cortisone acetate will be apparent from the absorption figures.

EXAMPLE 1

Cortisone acetate (2 g. $E_{1\,cm.}^{1\%}$ = 369 at 238 mμ $[\alpha]_D^{20}$ +175° in acetone)

dissolved in acetonitrile (100 ml.) was treated with sodium metabisulphite (0.5 g.) dissolved in water (50 ml.). The homogeneous mixture was heated under reflux on the steam bath for 16 hours. The mixture was then distilled on the water bath under reduced pressure to a volume of about 20 ml., water (100 ml.) was added and the resulting suspension digested on the steam bath for 30 minutes. The suspended solid was collected by filtration, washed with water to free it from inorganic salts and dried at reduced pressure at 100° C.

There was obtained in this way cortisone acetate 1.64 g. (82% yield) with $E_{1\,cm.}^{1\%}$ 381 at 238 mμ

$[\alpha]_D^{20}$ +181° in acetone.

EXAMPLE 2

Cortisone acetate (5 g. $E_{1\,cm.}^{1\%}$ 367 at 238 mμ; $[\alpha]_D^{20}$ +175° in acetone)

in ethyl acetate (250 ml.) was treated with sodium metabisulphite (12.5 g.) in water (250 ml.). The mixture (consisting of an organic layer and a lower aqueous layer) was stirred and heated under reflux on the steam-bath for 16 hours. The mixture was then cooled to room temperature, the aqueous layer separated off and the ethyl acetate layer washed twice with water (50 ml. each wash). The ethyl acetate was distilled off in vacuo, the residue was treated with ether (50 ml.) and the product collected by filtration, washed with a little ether and dried for 1 hour at 100° C. at reduced pressure.

This gave 4.43 g. (88.6% recovery) of cortisone acetate with $E_{1\,cm.}^{1\%}$ 382 at 238 mμ and $[\alpha]_D^{20}$ +180° in acetone.

EXAMPLE 3

A solution of crude cortisone acetate (ca. 1 kg.) in ethyl acetate (derived from the bromination, dehydrobromination and Girard P separation of 2 kg. of 4:5α-dihydrocortisone acetate as described in copending applications Serial Numbers 441,686, 444,916, 447,394, and 507,146) was washed at room temperature with a solution of sodium metabisulphite (5 kg.) in water (20 l.). The aqueous layer was back-extracted with ethyl acetate (8 l.) and the combined ethyl acetate solution was refluxed for 16 hours with stirring with a solution of sodium metabisulphite (5 kg.) in water (40 l.). After cooling, the organic layer was separated and washed twice with water. The main aqueous layer and the two aqueous wash layers were extracted successively with ethyl acetate (8 l.). The combined ethyl acetate solution was dried by stirring for 1 hour with anhydrous sodium sulphate (2 kg.). Decolourising charcoal (400 g.) was added, stirring continued for 1 hour and then the solids were removed by filtration, washed with a little ethyl acetate and the combined ethyl acetate filtrate was evaporated to dryness at reduced pressure. The residual solid was slurried with ether (10 l.) with cooling, and the purified cortisone acetate collected by filtration, washed with a little ether and dried in a vacuum oven at 100° C. for 2 hours.

There was obtained in this way 860 g. of cortisone acetate, $E_{1\,cm.}^{1\%}$ = 380 at 238 mμ

$[\alpha]_D^{20}$ +180° in acetone.

EXAMPLE 4

Impure cortisone alcohol (1.1 g.) containing about 10% of Δ$^1$-dehydro-4:5α-dihydrocortisone alcohol, and having $E_{1\,cm.}^{1\%}$ of 414 at 238 mμ in alcohol solution, was dissolved in ethyl acetate (50 ml.) and treated with a solution of sodium metabisulphite (1 g.) in water (25 ml.). The mixture was refluxed for 16 hours on the steam-bath. After cooling, the phases were separated and the ethyl acetate layer was washed twice with 15 ml. volumes of water, the original aqueous phase and the water washes being passed successively through a backwash of ethyl acetate (20 ml.) the combined ethyl acetate extracts distilled to small bulk, ether (20 ml.) was added and the product was filtered off, and dried in a vacuum desiccator, to give pure cortisone alcohol (0.8 g.), M.P. 222–224° C., $E_{1\,cm.}^{1\%}$ in alcohol = 437 at 238 mμ

EXAMPLE 5

A solution of crude cortisone acetate (4.5 g. $E_{1\,cm.}^{1\%}$ at 238 mμ = 370 in alcohol)

in ethyl acetate (300 ml.) was refluxed on a steam-bath for sixteen hours with sodium sulphite (30 g.) in water (300 ml.). The mixture was cooled and the phases separated. The ethyl acetate phase was washed twice with water (100 ml. each time), the aqueous phase and the washes being passed successively through a backwash of ethyl acetate (100 ml.). The combined ethyl acetate solutions were dried with sodium sulphate and were then distilled to near dryness. Ether (50 ml.) was added, and the product was filtered off and oven-dried at reduced pressure at 100° C., to give substantially pure cortisone acetate 3.80 g.

$E_{1\,cm.}^{1\%}$ at 238 m$\mu$ = 379 in alcohol

EXAMPLE 6

*Sodium 21-acetoxy-17α-hydroxy-3:11:20-trioxo-5α-pregnane-1ξ-sulphonate monohydrate*

21-acetoxy-17α-hydroxy-5α - pregn - 1 - ene - 3:11:20: trione (4.02 g.) in refluxing ethanol (100 ml.) and ethyl acetate (20 ml.) was treated with sodium metabisulphite (0.95 g.; 1 mole) in hot water (25 ml.). An atmosphere of nitrogen was maintained. Aliquots were withdrawn from time to time, and acidified with hydrochloric acid; after 5.5 hours the amount of $SO_2$ evolved by an aliquot was imperceptible. The main bulk was then concentrated to a small volume under reduced pressure, and the precipitated material filtered off.

The filtrate was extracted three times with ethyl acetate and the aqueous phase was evaporated to dryness, toluene being added to promote removal of the water. The desiccated residue was extracted into refluxing anhydrous ethanol, filtered through kieselguhr and evaporated to small bulk. Crystallisation began while the solution was hot and additions of benzene intended to promote it made little apparent effect. Refrigeration and filtration led to the isolation of a solid (1.99 g., 48%) (as small rhombs), M.P. 223–226° C. (capillary: decomp.) with gas evolution and darkening at above 230° C., 208–214° C. (Koffler, slight decomp.), $[\alpha]_D^{22}$ +100° (c, 1.745; water), $\lambda$ max. (water) 290 m$\mu$ ($E_{1\,cm.}^{1\%}$ 1)

This product was readily soluble in water and gave no precipitate or cloudiness with neutral barium chloride. The infra-red spectrum showed bands at 1185 and 1038 cm.$^{-1}$ probably due to the $SO_3Na$ group. (Found: C, 52.5; H, 6.4; S, 6.2. $C_{23}H_{31}O_9SNa.H_2O$ (524.55) requires C, 52.7; H, 6.3; S, 6.1%.)

The sulphonate (0.139 g.) in water (2 ml.) was treated with M-semicarbazide solution (1 ml.) and heated for 3 hours on the steam-bath. The precipitated needles were washed with water and extracted at once into a two-phase system composed of ethyl acetate, chloroform and 5 N-hydrochloric acid, the aqueous layer being the less dense. Ten extractions, each with stirring, of the aqueous phase afforded a denser organic phase. The combined organic phases were washed five times with 5 N-hydrochloric acid, then with sodium hydrogen carbonate and finally with water. The residue obtained by evaporation of the dried (over $MgSO_4$) organic phases was acetylated at room temperature for 2 hours, with acetic anhydride (1 ml.) and desiccated. Crystallisation from ethyl acetate gave 21-acetoxy-17α-hydroxy-5α-pregn-1-ene-3:11:20-trione (0.031 g., 29% from the sulphonate), mainly as needles, M.P. (Koffler) 247–248° C., $[\alpha]_D^{20}$ +128° (c, 0.295), $\lambda$ max. 227.5 m$\mu$ ($E_{1\,cm.}^{1\%}$ 265)

EXAMPLE 7

Cortisone acetate containing about 10% of $\Delta^{-1}$ dehydro-4:5-dihydrocortisone acetate (22 g. $\lambda$ max. 238 m$\mu$ $E_{1\,cm.}^{1\%}$ 356 $[\alpha]_D^{20}$ +203° (dioxan)) was dissolved by refluxing in ethyl acetate (600 ml.). A solution of potassium metabisulphite (60 g.) in water (600 ml.) was added, and the mixture was stirred under reflux for 16 hours. The mixture was cooled and the organic phase was separated and washed with water (500 ml.). The aqueous layers were successively extracted with a backwash of ethyl acetate (100 ml.). The combined ethyl acetate solutions were distilled to near dryness, and ether (100 ml.) was added. The mixture was cooled at 0° C. for 1 hour, the solid was collected by filtration, washed with a little ether, and oven dried at 100° C. at reduced pressure for 2 hours.

The product, relatively pure cortisone acetate (17.7 g.) had $E_{1\,cm.}^{1\%}$ 382 at 238 m$\mu$ in alcohol, and $[\alpha]_D^{20}$ +211° (dioxan).

EXAMPLE 8

Crude $\Delta^1$ cortisone acetate ($E_{1\,cm.}^{1\%}$ = 331 at 238 m$\mu$; $[\alpha]_D^{20}$ +210° (c, 0.5 in dioxan)) (prepared from 21-acetoxy-17α-hydroxy-5α-pregnane-3:11:20-trione (40 g.) by bromination and dehydrobromination of the resulting crude 2:4-dibromo compound) was dissolved in hot industrial methylated spirit (800 ml.) a solution of sodium metabisulphite (40 g.) in water (360 ml.) added and the solution refluxed for fifteen minutes. The hot solution was diluted with water (800 ml.), cooled to room temperature and extracted with methylene chloride (4 x 300 ml.). The first three extracts were combined, washed with water (2 x 1 litre) containing a little added sodium chloride, the aqueous phases being back extracted with the fourth methylene chloride extract. The combined extracts were stirred for 45 minutes with anhydrous sodium sulphate (60 g.) and charcoal (12 g.), the inorganic solids removed by filtration, washed with methylene chloride (4 x 50 ml.) and the combined filtrate and washings concentrated, under reduced pressure, to dryness. The residue was refluxed for 10 minutes with methanol (40 ml.), the slurry cooled, ether (20 ml.) added and set aside at 0° overnight. Slightly impure $\Delta^1$ cortisone acetate was collected by filtration, washed with a little ether and dried at 60° to constant weight, (20.2 g., $E_{1\,cm.}^{1\%}$ = 367 at 238 m$\mu$; $[\alpha]_D^{20}$ +186° (c, 0.5 dioxan))

The product was refluxed for 15 minutes in methanol (320 ml.) containing charcoal (4 g.) the charcoal removed by filtration and the bed washed with hot methanol (3 x 15 ml.). The filtrate and washings were combined, concentrated under reduced pressure to a slurry of about 80 ml. volume, cooled at 0° overnight and relatively pure $\Delta^1$ cortisone acetate collected, washed with a little ether and dried at reduced pressuer at 60° C.

(17 g., M.P. 240°, $E_{1\,cm.}^{1\%}$ 378 at 238 m$\mu$, $[\alpha]_D^{20}$ +188° (c, 0.5 dioxan))

We claim:

1. A process for the separation of a water-insoluble steroid compound having the formula

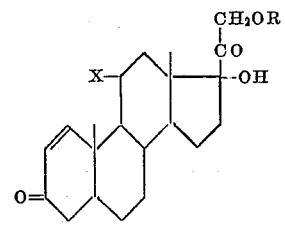

in which X is a substituent selected from the group consisting of a ketonic oxygen atom and a hydroxyl group and R is selected from the group consisting of a hydrogen atom and an acyl group derived from a lower alkanoic acid, from a mixture of said compound with at least one water-insoluble steroid compound selected from the group consisting of a steroid compound having the formula.

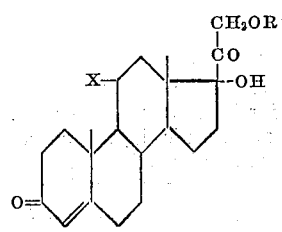

in which X and R have the above meaning and the corresponding $\Delta^{1:4}$-steroid compound, which process comprises reacting the mixture at a pH within the range of 4–8 with bisulphite ions in aqueous soltuion, said ions being furnished by a substance selected from the group consisting of a water-soluble inorganic metabisulphite, a water-soluble inorganic sulphite and sulphurous acid to form a water-soluble derivative of said first-named $\Delta^1$-steroid compound while leaving the other steroid components of said mixture substantially unchanged; and separating the unreacted steroid material from the reacted steroid material by difference in water solubility.

2. A process as claimed in claim 1 in which the substance furnishing bisulphite ions is a water-soluble inorganic metabisulphite.

3. A process as claimed in claim 2 in which said metabisulphite is sodium metabisulphite.

4. A process as claimed in claim 1 in which said second named steroid compound comprises cortisone acetate.

5. A process as claimed in claim 1 in which said second-named steroid compound comprises $\Delta^1$ cortisone acetate.

6. A process as claimed in claim 1 in which said second-named steroid compound comprises $\Delta^1$ hydrocortisone acetate.

7. The process of claim 1 in which the hydrogen atom in the 5-position of said first-mentioned $\Delta^1$-steroid compound has the $\alpha$-configuration.

8. A process as claimed in claim 1 in which said mixture is dissolved in an inert water-miscible organic solvent when reacted with said bisulphite ions.

9. A process as claimed in claim 1 in which said mixture is dissolved in an inert water-immiscible organic solvent when reacted with said bisulphite ions.

References Cited in the file of this patent

UNITED STATES PATENTS 2,883,378     Wettstein _____ Apr. 21, 1959